United States Patent
Kuzuya

(10) Patent No.: US 9,117,293 B2
(45) Date of Patent: Aug. 25, 2015

(54) IMAGE PROCESSING APPARATUS, IMAGE PICKUP APPARATUS, AND IMAGE PROCESSING METHOD THAT USE A SUPER-RESOLUTION TECHNIQUE FOR GENERATING A SUPER-RESOLUTION IMAGE

(71) Applicant: Sony Corporation, Tokyo (JP)

(72) Inventor: Naoki Kuzuya, Tokyo (JP)

(73) Assignee: Sony Corporation, Tokyo (JP)

( * ) Notice: Subject to any disclaimer, the term of this patent is extended or adjusted under 35 U.S.C. 154(b) by 24 days.

(21) Appl. No.: 14/065,803

(22) Filed: Oct. 29, 2013

(65) Prior Publication Data

US 2014/0176751 A1  Jun. 26, 2014

(30) Foreign Application Priority Data

Dec. 20, 2012 (JP) ................................. 2012-277701

(51) Int. Cl.
*G06T 3/40* (2006.01)
*G06T 5/00* (2006.01)

(52) U.S. Cl.
CPC .............. *G06T 3/4053* (2013.01); *G06T 3/403* (2013.01); *G06T 5/003* (2013.01); *G06T 2207/20192* (2013.01)

(58) Field of Classification Search
CPC ..... G06T 3/403; G06T 3/4053; G06T 3/0093; G06T 3/0006; G06T 3/60; G06T 1/20; G06T 19/00; G06T 11/60; G06T 5/001; G06K 9/18; G06K 9/32; G06K 9/228; G06K 9/6203; H04N 9/045; H04N 7/01

USPC ................... 348/143; 382/293, 295, 298–300
See application file for complete search history.

(56) References Cited

U.S. PATENT DOCUMENTS

| | | | |
|---|---|---|---|
| 6,434,280 B1 * | 8/2002 | Peleg et al. .................... | 382/299 |
| 6,766,068 B2 * | 7/2004 | Aoyama et al. ............... | 382/300 |
| 7,016,914 B2 * | 3/2006 | Nayak ............................ | 1/1 |
| 7,215,831 B2 * | 5/2007 | Altunbasak et al. .......... | 382/299 |
| 7,218,796 B2 * | 5/2007 | Bishop et al. ................. | 382/299 |
| 7,738,739 B2 * | 6/2010 | Altunbasak et al. .......... | 382/300 |
| 8,233,734 B2 * | 7/2012 | Zhang et al. .................. | 382/254 |
| 8,483,515 B2 * | 7/2013 | Matsunobu et al. .......... | 382/299 |

(Continued)

FOREIGN PATENT DOCUMENTS

| | | |
|---|---|---|
| JP | 2011-171843 | 9/2011 |
| JP | 2011-524714 | 9/2011 |

*Primary Examiner* — Pritham Prabhakher
(74) *Attorney, Agent, or Firm* — Fishman Stewart Yamaguchi PLLC

(57) ABSTRACT

An image processing apparatus includes: a high-pass filter that extracts a high-frequency component of an input image; an edge judgment unit that judges whether there is an edge based on the high-frequency component and estimates an edge position when there is an edge; a coordinate conversion unit that obtains an edge position in an enlarged image corresponding to the estimated edge position; an interpolation unit that obtains, regarding a position where an edge position of the high-frequency component and the edge position of the enlarged image overlap, a pixel value at each pixel position of an edge circumference of the enlarged image using a pixel value of the high-frequency component; a first enlargement processing unit that generates the enlarged image by enlarging by a desired enlargement factor; and a synthesis unit that synthesizes the interpolated pixel value of the high-frequency component and the pixel value of the enlarged image.

18 Claims, 11 Drawing Sheets

(56) References Cited

U.S. PATENT DOCUMENTS

| | | | |
|---|---|---|---|
| 8,526,765 B2* | 9/2013 | Sakaguchi et al. | 382/299 |
| 8,538,203 B2* | 9/2013 | Pan | 382/300 |
| 8,861,895 B2* | 10/2014 | Koga et al. | 382/300 |
| 2003/0179935 A1* | 9/2003 | Kubota | 382/199 |
| 2005/0018077 A1* | 1/2005 | De Haan et al. | 348/458 |
| 2006/0290950 A1* | 12/2006 | Platt et al. | 358/1.2 |
| 2006/0291741 A1* | 12/2006 | Gomi et al. | 382/266 |
| 2008/0050032 A1* | 2/2008 | Okuno et al. | 382/266 |
| 2010/0182459 A1* | 7/2010 | Hwang et al. | 348/240.99 |
| 2011/0200270 A1* | 8/2011 | Kameyama | 382/260 |
| 2011/0206296 A1* | 8/2011 | Sakaguchi et al. | 382/299 |
| 2012/0269445 A1* | 10/2012 | Matsunobu et al. | 382/199 |
| 2012/0269455 A1* | 10/2012 | Mitsunaga et al. | 382/269 |
| 2013/0084014 A1* | 4/2013 | Huang et al. | 382/199 |
| 2013/0094781 A1* | 4/2013 | Koga et al. | 382/300 |
| 2014/0072242 A1* | 3/2014 | Wei et al. | 382/299 |

* cited by examiner

IMAGE PROCESSING APPARATUS, IMAGE PICKUP APPARATUS, AND IMAGE PROCESSING METHOD THAT USE A SUPER-RESOLUTION TECHNIQUE FOR GENERATING A SUPER-RESOLUTION IMAGE

CROSS REFERENCE TO RELATED APPLICATIONS

This application claims the benefit of Japanese Priority Patent Application JP 2012-277701 filed Dec. 20, 2012, the entire contents of which are incorporated herein by reference.

BACKGROUND

The present disclosure relates to an image processing method and an image processing apparatus, more particularly, to an image processing apparatus, an image pickup apparatus, and an image processing method that use a super-resolution technique of generating a super-resolution image by enhancing a resolution of an arbitrary input image.

From the past, as a super-resolution technique of enhancing a resolution of a low-resolution image and restoring information that cannot be restored by a normal enlargement method, there is a method of performing super-resolution processing using a high-frequency component included in an image (see Japanese Patent Application Laid-open No. 2011-171843; hereinafter referred to as Patent Document 1). In the method disclosed in Patent Document 1, it is necessary to create a low-resolution image from a high-resolution image and learn data in advance as a preparation stage for carrying out the super-resolution processing and obtain an interpolation filter coefficient defining a conversion relationship (learning step). Then, using the interpolation filter coefficient obtained in the learning step, a high-resolution output image is obtained from an arbitrary low-resolution input image (restoration step).

Further, as another method of performing super-resolution processing using a high-frequency component included in an image, there is a technique of using matching processing (block matching) for estimating a pixel position to which the high-frequency component is to be applied in an enlarged image (see Japanese Patent Application Laid-open No. 2011-524714; hereinafter, referred to as Patent Document 2).

SUMMARY

Incidentally, in the technique disclosed in Patent Document 1, it is necessary to learn the interpolation filter coefficient in advance. Such leaning uses a large amount of images, and it takes longer time in development than other methods that do not require learning. In other words, adopting the method that requires learning leads to an increase in development costs.

Furthermore, while the matching processing is used in the technique disclosed in Patent Document 2, since a large data processing amount is necessary in the matching processing in general, hardware costs increase or a power consumption increases for raising an operation speed (clock frequency).

As described above, according to the super-resolution technique of the related art, there have been many inconveniences such as a requirement of learning in advance and a large data processing amount.

In view of the circumstances as described above, there is a need for a technique that can eliminate a previous preparation such as learning and uses a small data processing amount.

According to an embodiment of the present disclosure, a high-frequency component of an input image is extracted, whether there is an edge in the input image is judged based on the extracted high-frequency component of the input image, and an edge position is estimated when there is an edge. An edge position in an enlarged image obtained by enlarging the input image is obtained, the edge position corresponding to the estimated edge position. Regarding a position where an edge position of the high-frequency component of the input image and the edge position of the enlarged image overlap, a pixel value at each pixel position of an edge circumference of the enlarged image is obtained using a pixel value of the high-frequency component of the input image. After that, the interpolated pixel value of the high-frequency component of the edge circumference and the pixel value of the pixel of the enlarged image are synthesized.

In obtaining the pixel value at each pixel position of the edge circumference of the enlarged image using the pixel value of the high-frequency component of the input image, a pixel value also including a component other than the high-frequency component of the input image may be used instead of the pixel value of the high-frequency component of the input image.

According to the embodiment of the present disclosure, the edge position is estimated by combining a general filter operation and a coordinate calculation in a process of the super-resolution processing.

According to at least one embodiment of the present disclosure, a super-resolution enlargement is realized by adopting a method that uses a combination of a general filter operation and a coordinate calculation so that an operational processing amount does not increase, for the estimation of an edge position while using the high-frequency component of an image as in the super-resolution technique of the related art. Therefore, an advance preparation such as learning is unnecessary, and a data processing amount can be made small.

These and other objects, features and advantages of the present disclosure will become more apparent in light of the following detailed description of best mode embodiments thereof, as illustrated in the accompanying drawings.

DETAILED DESCRIPTION OF EMBODIMENTS

Figure 1:
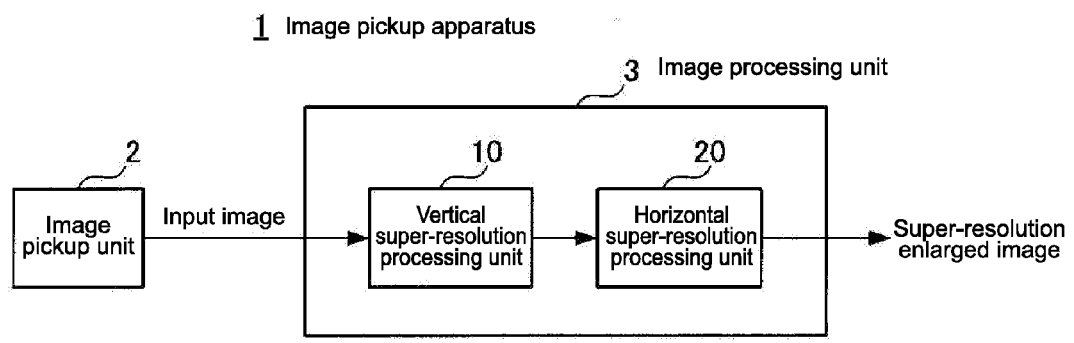
FIG. 1 is a block diagram showing an overall structural example of an image pickup apparatus according to a first embodiment of the present disclosure.

Hereinafter, embodiments of the present disclosure will be described with reference to the drawings. In the specification and drawings, structural elements including practically the same functions and structures are denoted by the same reference numerals, and overlapping descriptions will be omitted. The descriptions will be given in the following order.

1. First embodiment (image processing unit: example where super-resolution component is generated from high-frequency component of image, and super-resolution component is synthesized with enlarged image)

2. Second embodiment (image processing unit: example where 2D image is processed as it is)

3. Others

<1. First Embodiment>

In a first embodiment of the present disclosure, descriptions will be given on an example where processing of generating a super-resolution component of an edge circumference from a high-frequency component of an input image (input image signal) and synthesizing the super-resolution component to an image obtained by enlarging the input image is first applied to a longitudinal direction (vertical direction) of the image and then applied to a lateral direction (horizontal direction) of the image. Here, descriptions will be given while taking a case where a grayscale image is doubly enlarged (resolution of 4 times) as an example. This method is also applicable to a case where an input image is a color image or a case where enlargement factors other than two times (e.g., 1.5 times and 3 times) are used.

(Overall Structural Example of Image Pickup Apparatus)

FIG. 1 is a block diagram showing an overall structural example of an image pickup apparatus according to a first embodiment of the present disclosure.

The image pickup apparatus 1 shown in FIG. 1 is an example where an image processing apparatus is applied to a digital still camera and includes at least an image pickup unit 2 and an image processing unit 3.

The image pickup unit 2 converts image light that has entered via an optical device into an electrical signal and outputs the signal to the image processing unit 3. As the image pickup unit 2, a CMOS (Complementary Metal Oxide Semiconductor) image sensor or a CCD (Charge Coupled Device) image sensor can be used, for example.

The image processing unit 3 generates a super-resolution image having a higher resolution by enhancing a resolution of an arbitrary input image (hereinafter, referred to as super-resolution image). The image processing unit 3 includes a vertical super-resolution processing unit 10 and a horizontal super-resolution processing unit 20. In the image processing unit 3, super-resolution processing in a vertical direction is first carried out on an input image by the vertical super-resolution processing unit 10, and with respect to the result of the processing, super-resolution processing in a horizontal direction is carried out by the horizontal super-resolution processing unit 20, to thus obtain a final super-resolution image.

An image signal of a super-resolution enlarged image output from the image processing unit 3 is converted into a signal format suited for a display apparatus (not shown) and output to the display apparatus.

Alternatively, the image signal of the super-resolution enlarged image may be subjected to compression processing and recorded onto a recording medium.

(Structural Example in Image Processing Unit (Super-Resolution Processing Unit))

Hereinafter, internal structural examples of the vertical super-resolution processing unit 10 and the horizontal super-resolution processing unit 20 in the image processing unit 3 will be described.

Figure 2:
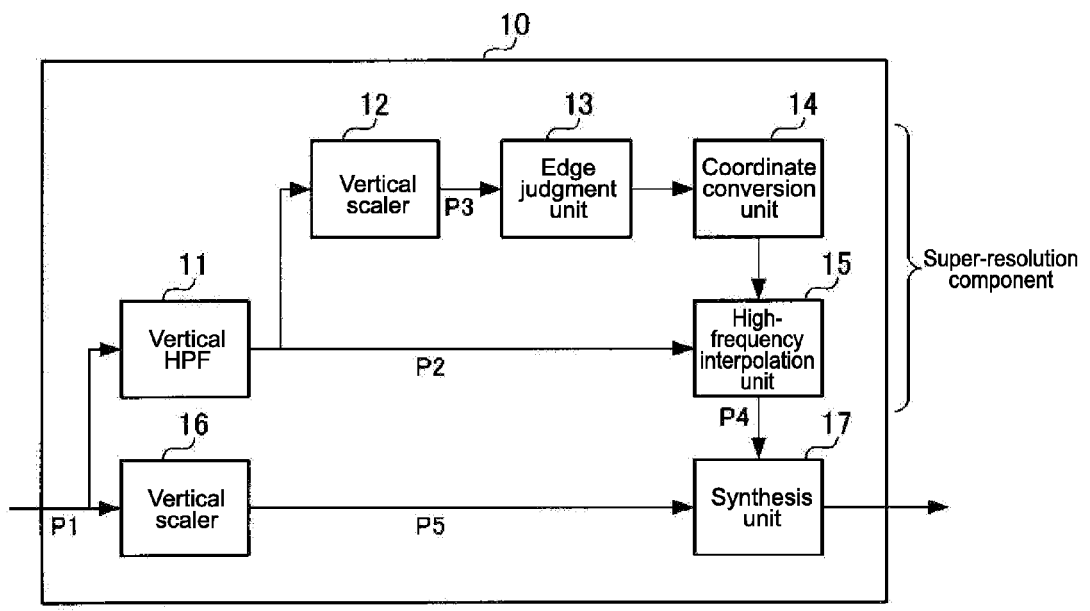
FIG. 2 is a block diagram showing an internal structural example of a vertical super-resolution processing unit in an image processing unit.

FIG. 2 is a block diagram showing the internal structural example of the vertical super-resolution processing unit 10 in the image processing unit 3.

The vertical super-resolution processing unit 10 includes a vertical high-pass filter (hereinafter, referred to as vertical HPF) 11, a vertical scaler 12, an edge judgment unit 13, a coordinate conversion unit 14, a high-frequency interpolation unit 15, a vertical scaler 16, and a synthesis unit 17.

Figure 3:
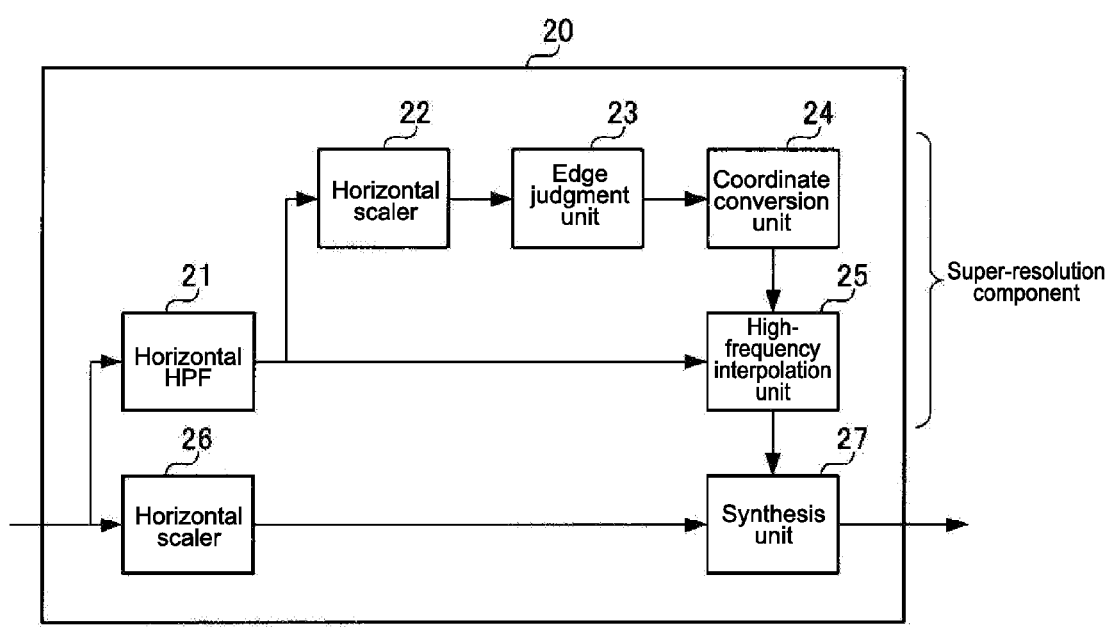
FIG. 3 is a block diagram showing an internal structural example of a horizontal super-resolution processing unit in the image processing unit.

FIG. 3 is a block diagram showing the internal structural example of the horizontal super-resolution processing unit 20 in the image processing unit 3.

The horizontal super-resolution processing unit 20 includes a horizontal high-pass filter (hereinafter, referred to as horizontal HPF) 21, a horizontal scaler 22, an edge judgment unit 23, a coordinate conversion unit 24, a high-frequency interpolation unit 25, a horizontal scaler 26, and a synthesis unit 27. The processing blocks have the same functions as the corresponding processing blocks of the vertical super-resolution processing unit 10. The horizontal super-resolution processing unit 20 only repeats the processing carried out by the vertical super-resolution processing unit 10 in the horizontal direction of the image. Therefore, the vertical super-resolution processing unit 10 will be described in detail, and detailed descriptions of the horizontal super-resolution processing unit 20 will be omitted.

Hereinafter, the processing blocks of the vertical super-resolution processing unit 10 will be described.

The vertical HPF 11 is an example of a high-pass filter of the present disclosure and causes a signal to pass in a frequency band of a predetermined frequency or more. In this example, the vertical HPF 11 is applied to pixels of an input image (image signal) in the vertical direction and extracts a high-frequency component of the image in the vertical direction, that is, a portion where a pixel value of a focus pixel and pixel values of adjacent pixels below (or above) the focus pixel largely change. Hereinafter, a high-frequency component of an input image output from the HPF may be referred to as high-frequency image.

The vertical scaler 12 is an example of a second enlargement processing unit of the present disclosure, is provided subsequent to the vertical HPF 11, and carries out scaling processing of enlarging a high-frequency image output from the vertical HPF 11 by a predetermined enlargement factor. By the scaling processing, a resolution of an image in the vertical direction is converted into a desired resolution (twice in this example). Hereinafter, a high-frequency image enlarged by the vertical scaler 12 is also referred to as enlarged high-frequency image.

Figure 4:
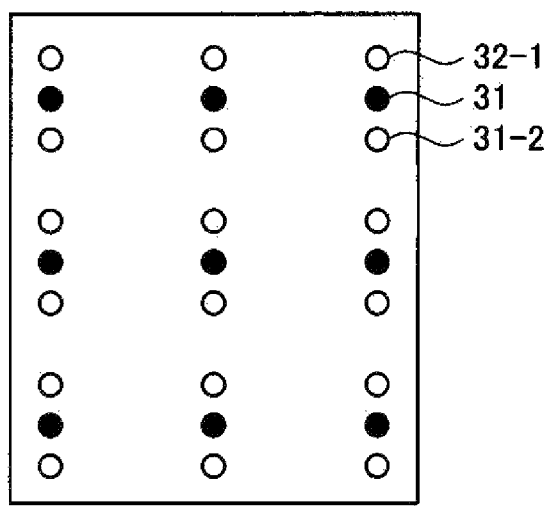
FIG. 4 is a schematic diagram showing a relationship between pixel positions of a high-frequency image obtained after passing through a vertical HPF and pixel positions of an enlarged high-frequency image obtained after passing through a vertical scaler.

FIG. 4 is a schematic diagram showing a relationship between pixel positions of a high-frequency image obtained after passing through the vertical HPF 11 and pixel positions of an enlarged high-frequency image obtained after passing through the vertical scaler 12.

The vertical scaler 12 sets, based on a pixel 31 (black dot) of an input image, two pixels 32-1 and 32-2 (white dots) above and below the pixel 31. Specifically, by the vertical scaler 12, the pixel count of the image in the vertical direction is converted into twice the pixel count. It should be noted that as described above, the vertical scaler 12 is also applicable to a case where enlargement factors other than twice are used according to settings.

Figure 5:
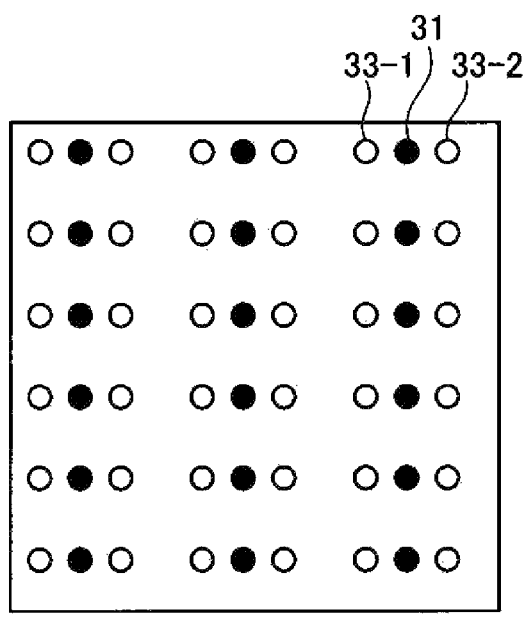
FIG. 5 is a schematic diagram showing a relationship between pixel positions of a high-frequency image obtained after passing through a horizontal HPF and pixel positions of an enlarged high-frequency image obtained after passing through a horizontal scaler.

It should be noted that FIG. 5 is a schematic diagram showing a relationship between pixel positions of a high-frequency image obtained after passing through the horizontal HPF 21 and pixel positions of an enlarged high-frequency image obtained after passing through the horizontal scaler 22.

The horizontal scaler 22 sets, based on the pixel 31 (black dot) of the input image, two pixels 33-1 and 33-2 (white dots) on left- and right-hand sides of the pixel 31. Specifically, by the horizontal scaler 22, the pixel count of the image in the horizontal direction is converted into twice the pixel count. It should be noted that as described above, the horizontal scaler 22 is also applicable to a case where enlargement factors other than twice are used as in the case of the vertical scaler 12.

Referring back to FIG. 2, the edge judgment unit 13 is provided subsequent to the vertical scaler 12 and judges whether there is an edge for each pixel with respect to an input image. Here, the edge judgment unit 13 judges whether there is an edge between a focus pixel in the enlarged high-frequency image that has been subjected to the scaling processing by the vertical scaler 12 and adjacent pixels, and when there is an edge, estimates an edge position. The edge judgment unit 13 judges that there is no edge when pixel values of the focus pixel and adjacent pixels are of the same code and judges that there is an edge when the codes differ.

Figure 6:
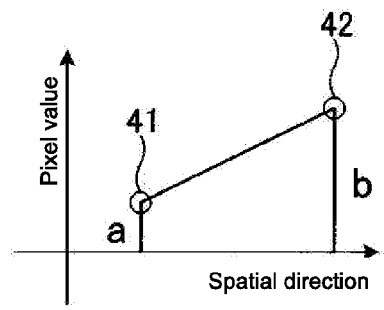
FIG. 6 is an explanatory diagram showing a relationship between pixel values of two pixels in a case where there is no edge.
Figure 7:
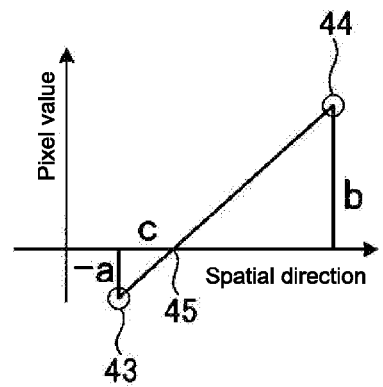
FIG. 7 is an explanatory diagram showing a relationship between pixel values of two pixels in a case where there is an edge.

Hereinafter, referring to FIGS. 6 and 7, a method of judging whether there is an edge and a method of estimating an edge position will be described. FIG. 6 is an explanatory diagram showing a relationship between pixel values of two pixels in a case where there is no edge. FIG. 7 is an explanatory diagram showing a relationship between pixel values of two pixels in a case where there is an edge.

As shown in FIG. 6, when a pixel value of a certain pixel 41 is represented by a (a>0) and a pixel value of an adjacent pixel 42 is represented by b (b>0), the edge judgment unit 13 judges that there is no edge between the pixels 41 and 42 since the pixel values thereof have the same code.

Further, as shown in FIG. 7, when a pixel value of a certain pixel 43 is represented by −a (a>0) and a pixel value of an adjacent pixel 44 is represented by b (b>0), the edge judgment unit 13 judges that there is an edge between the pixels 43 and 44 since the pixel values thereof have different codes. It is judged that there is an edge also when the code of the pixel value of the pixel 43 is + and the code of the pixel value of the pixel 44 is −.

When judging that there is an edge, the edge judgment unit 13 estimates an edge position. When connecting the pixels 43 and 44 in a straight line in FIG. 7, an intersection of the straight line and a line segment indicating a pixel value 0 is estimated as an edge position 45. When a distance between the pixels is 1, a distance c between the pixel 43 (focus pixel) and the edge position 45 in FIG. 7 can be obtained by the following expression.

$$c=a/(a+b)$$

It should be noted that the edge position estimation processing is an inter-pixel interpolation problem itself and may be realized by methods other than that described above (bilinear interpolation) such as a bicubic interpolation and a spline interpolation.

Referring back to FIG. 2, when it is judged by the edge judgment unit 13 that there is an edge, the coordinate conversion unit 14 obtains an edge position in the enlarged image, that corresponds to the edge position estimated by the edge judgment unit 13. Specifically, processing of converting coordinates of pixels at an edge circumference portion of the high-frequency image before the enlargement based on the estimated edge position is carried out. Here, in a state where the edge position of the high-frequency image before the enlargement and the edge position of the high-frequency image after the enlargement overlap, processing of converting the pixels of the high-frequency image before the enlargement according to the pixel positions of the high-frequency image after the enlargement is carried out.

Figure 8:
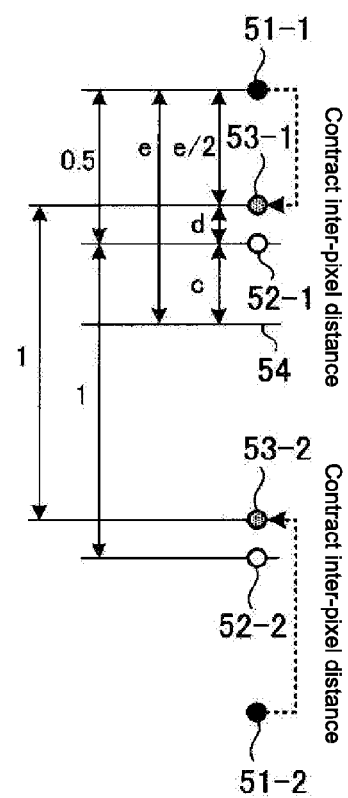
FIG. 8 is an explanatory diagram of coordinate conversion processing in a case where it is judged that there is an edge.

Hereinafter, the coordinate conversion processing carried out by the coordinate conversion unit 14 will be described with reference to FIG. 8.

It is assumed that a distance between pixel positions 51-1 and 51-2 of a high-frequency image before being enlarged, that are indicated by black dots, is 2, and a distance between pixel positions 52-1 and 52-2 of the high-frequency image after being enlarged, that are indicated by white dots, is 1. Pixel positions 53-1 and 53-2 indicated by gray dots are pixel positions to which an interval between the pixel positions 51-1 and 51-2 of the high-frequency image before being enlarged is contracted about an edge position 54 so that the inter-pixel distance of the high-frequency image before being enlarged (=2) becomes equal to the inter-pixel distance of the high-frequency image after being enlarged (=1).

Here, a case where the inter-pixel distance of the high-frequency image after being enlarged is 1 and it is estimated that an edge exists at a position apart by a distance c from the pixel position 52-1 of the high-frequency image after being enlarged will be discussed. In this case, using the fact that a distance between the pixel position 51-1 (51-2) of the high-frequency image before being enlarged and the pixel position 52-1 (52-2) of the high-frequency image after being enlarged is 0.50, a distance d between the pixel position 53-1 (53-2) after the coordinate conversion and the pixel position 52-1 (52-2) of the high-frequency image after being enlarged can be obtained by the following expression. It should be noted that e is a distance from the edge position 54 to the pixel position 51-1 of the high-frequency image before being enlarged.

$$e = c + 0.50$$
$$d = e - (e/2) - c$$
$$= 0.25 - (c/2)$$

In the descriptions hereinafter, when not distinguishing the pixel positions 51-1 and 51-2 of the high-frequency image before being enlarged from each other in particular, the pixel positions will collectively be referred to as pixel position 51. Further, when not distinguishing the pixel positions 52-1 and 52-2 of the high-frequency image after being enlarged from each other in particular, the pixel positions will collectively be referred to as pixel position 52. Furthermore, when not distinguishing the pixel positions 53-1 and 53-2 after the coordinate conversion from each other in particular, the pixel positions will collectively be referred to as pixel position 53.

When judged by the edge judgment unit 13 that there is an edge, the high-frequency interpolation unit 15 uses a high-frequency image output from the vertical HPF 11 to carry out interpolation processing of a high-frequency component at a pixel position in an image obtained by enlarging the input image (enlarged image). Here, using a positional relationship between a pixel after the coordinate conversion in the high-frequency image before being enlarged and a pixel of the high-frequency image after being enlarged, that have been calculated by the edge judgment unit 13, a pixel value at a pixel position of the image after being enlarged is interpolated based on a pixel value of the high-frequency image before being enlarged. The result of the interpolation processing is a super-resolution component of the pixel of the enlarged image. The interpolation processing is carried out in an edge circumference portion, that is, with respect to pixels above and below the edge position (N is arbitrary natural number). This result becomes a super-resolution image in the edge circumference. At this time, the super-resolution component obtained according to the distance between the estimated edge position and the pixel of the enlarged image may be weighted, for example. It should be noted that when it is judged that there is no edge, the high-frequency interpolation unit 15 sets the super-resolution component of the pixel to 0.

The vertical scaler 16 is an example of a first enlargement processing unit of the present disclosure and carries out scaling processing of enlarging an input image in the vertical direction by a desired enlargement factor for a purpose different from the edge extraction. Hereinafter, an image enlarged by the vertical scaler 16 will also be referred to as enlarged image. By the vertical scaler 16, the pixel count of the image in the vertical direction is converted into twice the pixel count. It should be noted that as described above, the vertical scaler 16 is also applicable to a case where enlargement factors other than twice are used according to settings. Such an enlargement may be performed by enlargement processing of the related art or may be performed by super-resolution processing unrelated to the present disclosure.

The synthesis unit 17 combines the super-resolution image generated by the high-frequency interpolation unit 15 and the enlarged image generated by the vertical scaler 16. At this time, it is possible to multiply each pixel value of the super-resolution image by an arbitrary gain, or filter processing may be carried out.

Figure 9:
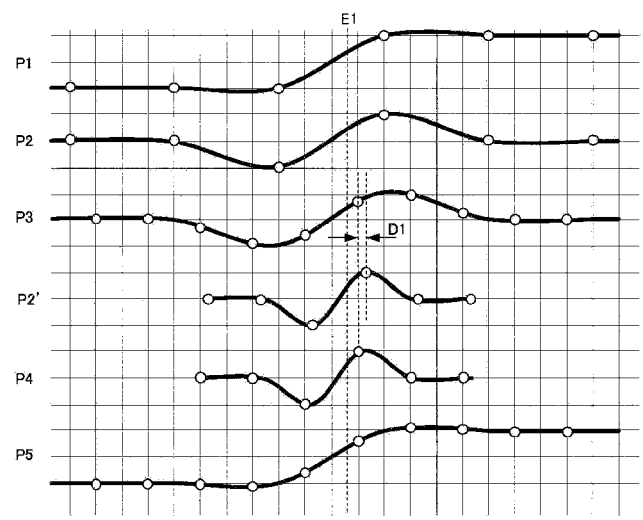
FIG. 9 is a diagram showing waveforms of signals at respective units of the vertical super-resolution processing unit shown in FIG. 2.

FIG. 9 is a diagram showing waveforms of signals of the respective units of the vertical super-resolution processing unit 10.

P1 is a signal waveform example of an image input to the vertical super-resolution processing unit 10, P2 is a signal waveform example output from the vertical HPF 11, P3 is a signal waveform example output from the vertical scaler 12, P4 is a signal waveform example output from the high-frequency interpolation unit 15, and P5 is a signal waveform example of an enlarged image output from the vertical scaler 16. White dots on the waveforms indicate pixels.

The signal P2 is a signal extracted from the signal P1 as a high-frequency component in the vertical HPF 11.

The signal P3 is generated from the signal P2 in the vertical scaler 12 and includes information on a pixel count that is twice as large as that of the signal P2. From the signal P3, the edge judgment unit 13 estimates an edge position E1 of the input image.

When a signal obtained by compressing the signal P2 (in case of double enlargement) to ½ about the edge position E1 is represented by P2', the coordinate conversion unit 14 calculates a distance D1 between the pixel position of the signal P3 and the pixel position of the signal P2'.

Based on the distance D1, a pixel value of the signal P2' at the pixel position of the signal P3 is obtained by an interpolation to thus generate the signal P4.

Finally, the synthesis unit 17 synthesizes the signal P4 of the high-frequency component of the input image and the signal P5 of the enlarged image.

(Operational Example of Super-Resolution Processing Unit)

Next, an operation of the super-resolution processing unit in the image processing unit 3 will be described. Here, an operation of the vertical super-resolution processing unit 10 will be taken as an example.

Figure 10:
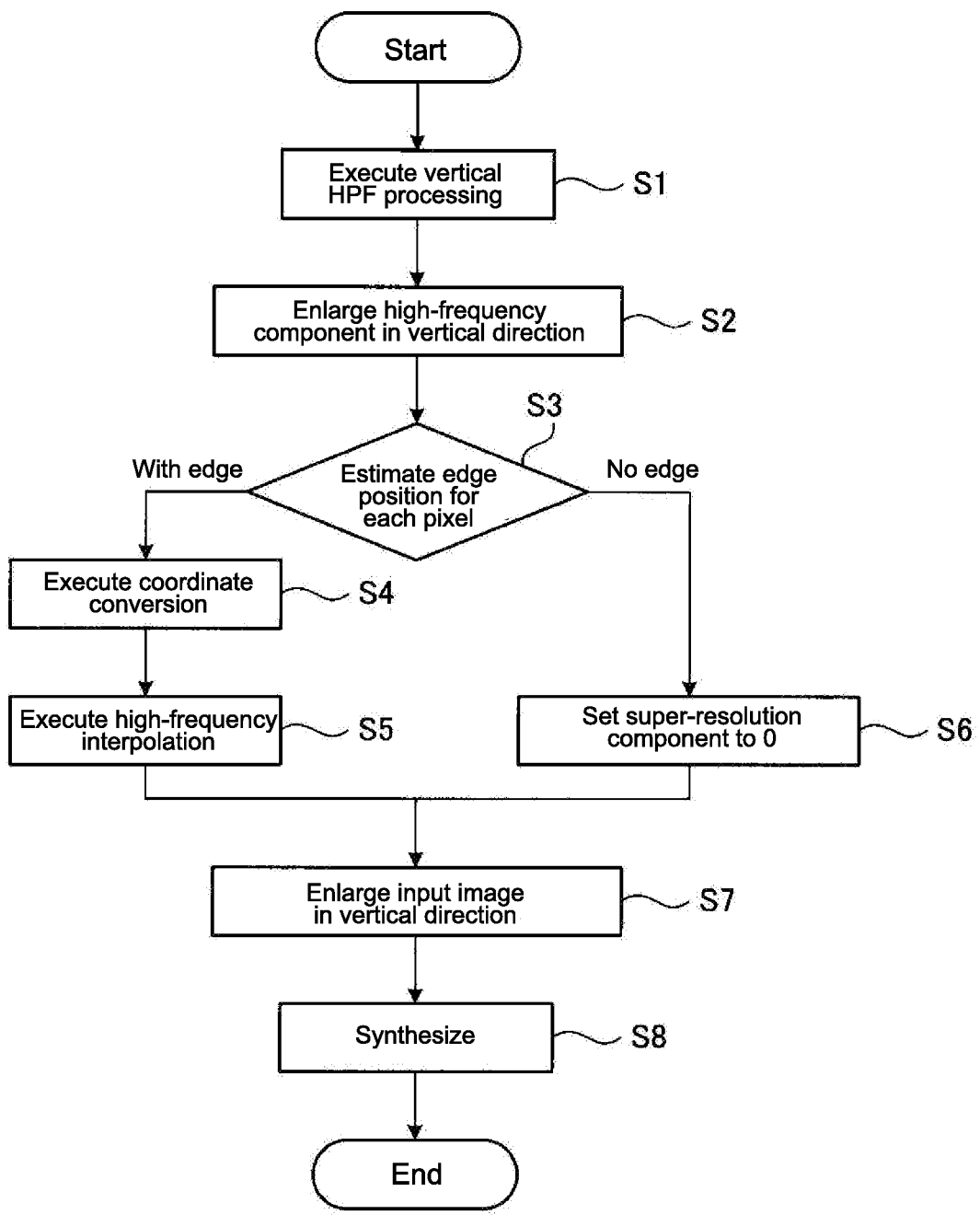
FIG. 10 is a flowchart showing a super-resolution processing example in a vertical direction, that is carried out by the vertical super-resolution processing unit shown in FIG. 2.
Figure 11:
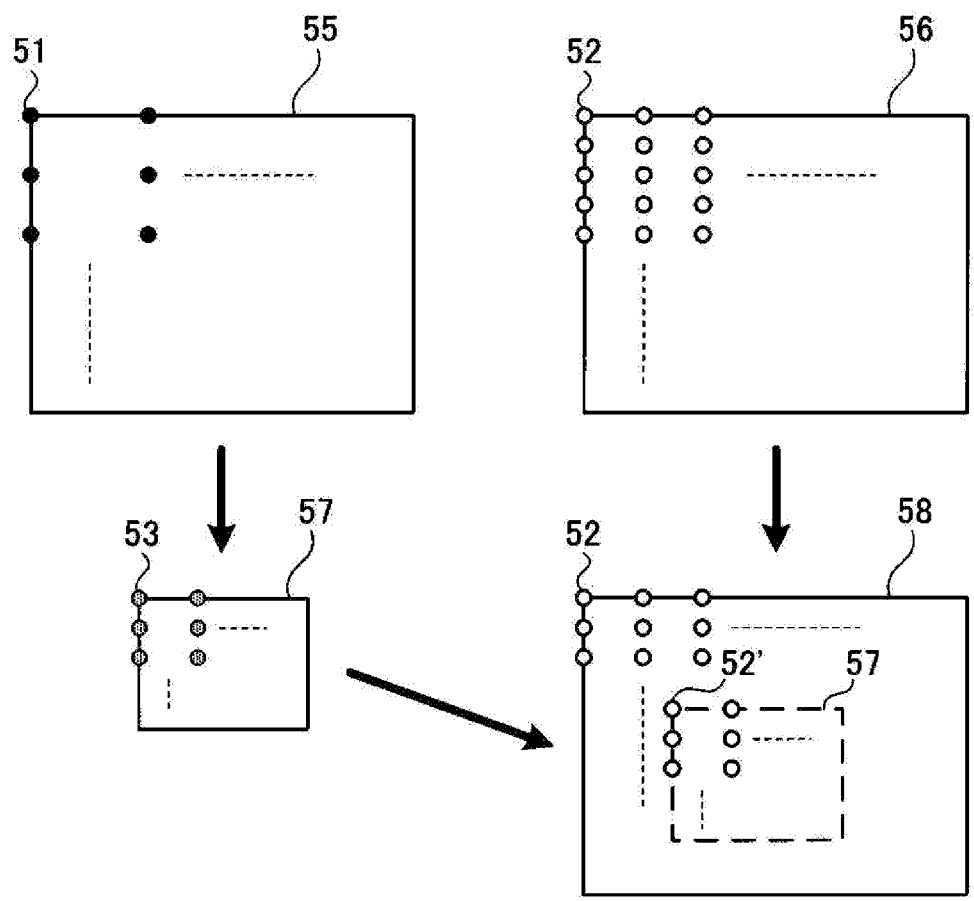
FIG. 11 is a diagram used for explaining the super-resolution processing shown in FIG. 10.

FIG. 10 is a flowchart showing a super-resolution processing example in the vertical direction, that is carried out by the vertical super-resolution processing unit 10. FIG. 11 is a diagram used for explaining the super-resolution processing shown in FIG. 10. In the example shown in FIG. 11, the double enlargement of an image in the vertical direction is expressed by doubling a pixel density in the vertical direction.

As the super-resolution processing is started, the vertical HPF 11 carries out high-pass filter processing on an image input to the vertical super-resolution processing unit 10 of the image processing unit 3 in the vertical direction of the input image and outputs a high-frequency image (Step S1). The input image corresponds to an image 55 constituted of pixels positioned at the pixel positions 51 arranged at regular intervals as shown in FIG. 11, for example.

Next, the vertical scaler 12 carries out the scaling processing of enlarging the high-frequency component (high-frequency image) output from the vertical HPF 11 in the vertical direction (see FIG. 4) and generates an enlarged high-frequency image (Step S2). The enlarged high-frequency image corresponds to an image 56 constituted of pixels arranged at the pixel positions 52, the image 56 obtained by doubly enlarging the vertical direction of the image 55 as shown in FIG. 11, for example.

Further, the edge judgment unit 13 judges whether there is an edge for each pixel of the enlarged high-frequency image output from the vertical scaler 12 and estimates an edge position (Step S3). Here, when there is an edge (see FIG. 7), the processing advances to Step S4, and when there is no edge (see FIG. 6), the processing advances to Step S6.

When it is judged by the judgment processing in Step S3 that there is an edge, the coordinate conversion unit 14 carries out processing of converting coordinate of pixels in the edge circumference portion of the high-frequency image before being enlarged based on the edge position estimated by the edge judgment unit 13 (see FIG. 8) (Step S4). The edge circumference portion corresponds to an edge circumference portion 57 constituted of pixels arranged at the pixel positions 53 after the coordinate conversion of the pixel positions 51 of the image 55 before being enlarged as shown in FIG. 11, for example.

Subsequently, the high-frequency interpolation unit 15 uses the pixel values of the high-frequency image output from the vertical HPF 11 to carry out interpolation processing of the high-frequency component at the pixel positions of the enlarged image output from the vertical scaler 16 based on the coordinate conversion result output from the coordinate conversion unit 14 (Step S5).

When it is judged in the judgment processing of Step S3 that there is no edge, the super-resolution component at the pixel positions corresponding to the enlarged image is set to 0 without carrying out the coordinate conversion processing and the high-frequency interpolation processing (Step S6).

While carrying out the processing of Steps S5 and S6, the vertical scaler 16 carries out the scaling processing of enlarging the input image in the vertical direction to generate an enlarged image (Step S7).

Then, the synthesis unit 17 carries out processing of synthesizing the super-resolution component generated by the high-frequency interpolation unit 15 and the enlarged image generated by the vertical scaler 16 (Step S8). The super-resolution enlarged image obtained by synthesizing the super-resolution component and the enlarged image corresponds to an image 58 constituted of pixels corrected by the pixel values of the pixel positions 52' of the edge circumference portion 57 using the pixel values of the pixels at the pixel positions 53 of the edge circumference portion 57 as shown in FIG. 11, for example.

The super-resolution processing is ended after the synthesis processing is ended for all pixels of the enlarged image, and when the synthesis processing is not ended for all pixels of the enlarged image, the synthesis processing is continued for the rest of the pixels. The synthesis unit 17 outputs a vertical super-resolution image, that is obtained by synthesizing the super-resolution component generated by the high-frequency interpolation unit 15 and the enlarged image generated by the vertical scaler 16, to the horizontal super-resolution processing unit 20.

The vertical super-resolution image input to the horizontal super-resolution processing unit 20 is subjected to horizontal super-resolution processing by the horizontal super-resolution processing unit 20, and thus a super-resolution image enlarged in both the vertical and horizontal directions is output.

According to the first embodiment structured as described above, a method of combining a general filter operation and coordinate calculation for estimating an edge position so that an operational processing amount does not increase is adopted while using a high-frequency component of an image as in the super-resolution technique of the related art. Therefore, in this embodiment, a data processing amount is smaller than that of the technique of the related art, and a super-resolution enlargement of an image can be realized with low-cost hardware. In addition, since the data processing amount can be suppressed, power consumptions of hardware can also be suppressed.

Furthermore, in this embodiment, time, effort and costs for development can be reduced since advance learning or the like is unnecessary.

It should be noted that although the super-resolution processing in the horizontal direction is carried out on the input image by the horizontal super-resolution processing unit 20 after the super-resolution processing in the vertical direction is carried out on the input image by the vertical super-resolution processing unit 10 in this example, the same effect can be obtained even when the vertical super-resolution processing is carried out after the horizontal super-resolution processing.

<2. Second Embodiment>

Hereinafter, a second embodiment of the present disclosure will be described. Also in the second embodiment, a super-resolution component of an edge circumference is generated from a high-frequency component of an input image (input image signal), and the super-resolution component is synthesized with an image obtained by enlarging the input image. It should be noted that in the second embodiment, a method of processing a 2D image as it is in a 2D state is adopted unlike the first embodiment. It should be noted that as in the first embodiment, a case of doubly enlarging (resolution of 4 times) a grayscale image is taken as an example, but this embodiment is also applicable to a case where enlargement factors other than twice are used.

(Structural Example of Image Processing Apparatus)

Figure 12:
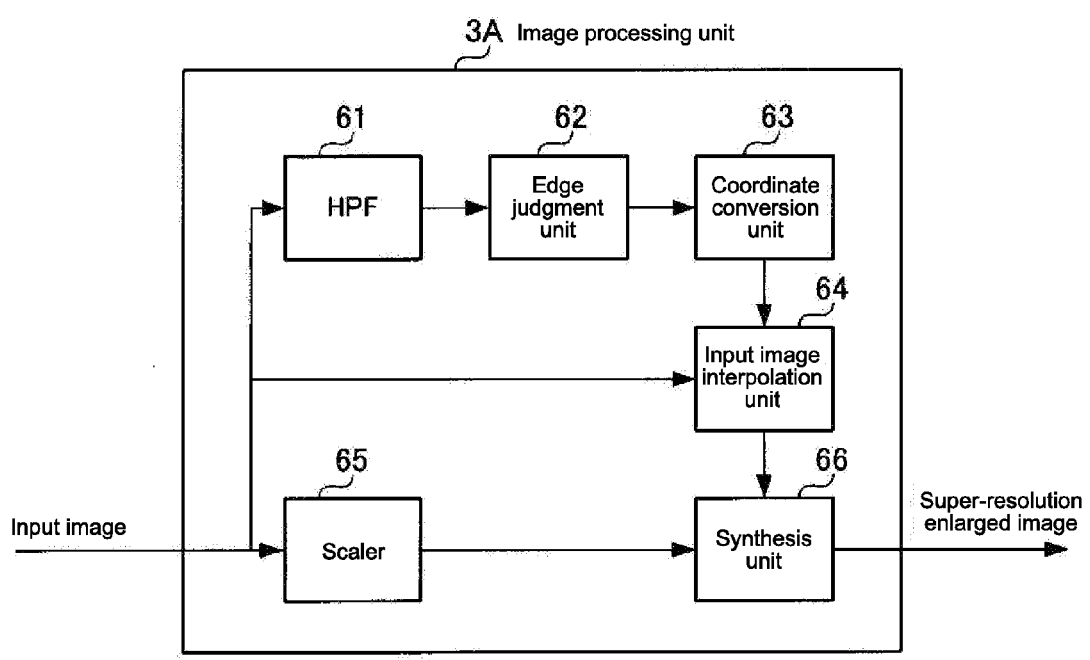
FIG. 12 is a block diagram showing an internal structural example of an image processing unit according to a second embodiment of the present disclosure.

FIG. 12 is a block diagram showing an internal structural example of an image processing unit according to the second embodiment of the present disclosure.

The image processing unit 3A shown in FIG. 12 includes a high-pass filter (hereinafter, referred to as HPF) 61, an edge judgment unit 62, a coordinate conversion unit 63, an input image interpolation unit 64, a scaler 65, and a synthesis unit 66. The image processing unit 3A includes similar functions as the image processing unit 3 of the image pickup apparatus 1 (FIG. 1) and carries out super-resolution processing on an input image in the vertical and horizontal directions. It should be noted that the image processing unit 3A does not include an image enlargement function of a scaler after the HPF processing as compared to the image processing unit 3.

The HPF 61 is an example of a high-pass filter of the present disclosure and causes a signal to pass in a frequency band of a predetermined frequency or more like the vertical HPF 11 and the horizontal HPF 21. Here, the HPF 61 extracts a high-frequency component of an input image in the vertical and horizontal directions, that is, a portion where a pixel value of a focus pixel and pixel values of pixels adjacent to the focus pixel in the vertical and horizontal directions largely change.

The edge judgment unit 62 is provided subsequent to the HPF 61 and judges whether there is an edge for each pixel with respect to an input image like the edge judgment unit 13. The edge judgment unit 62 judges whether there is an edge between a focus pixel and pixels adjacent thereto in the vertical and horizontal directions in the high-frequency image output from the HPF 61, and when there is an edge, estimates an edge position. Here, the edge judgment unit 62 focuses on 4 pixels including a focus pixel and a pixel on the right-hand side of the focus pixel, a pixel below the focus pixel, and a pixel on the lower right-hand side of the focus pixel and judges whether there is an edge between the focus pixel and those pixels.

Hereinafter, the method of judging whether there is an edge and the method of estimating an edge position will be described with reference to FIGS. 13 to 16.

Figure 13:
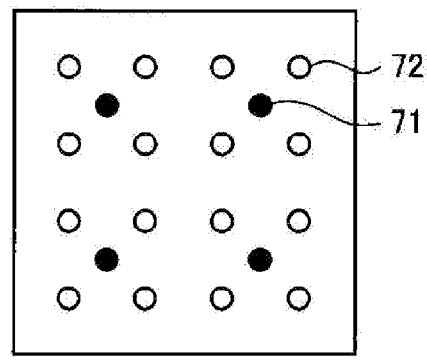
FIG. 13 is a schematic diagram showing a relationship between pixel positions of an image before being enlarged and pixel positions of the image after being enlarged.

FIG. 13 is a schematic diagram showing a relationship between pixel positions of an image before being enlarged and pixel positions of the image after being enlarged. Here, an example where an input image is doubly enlarged in the vertical and horizontal directions is shown.

With respect to a pixel 71 (black dot) of an image before being enlarged, 4 pixels 72 (white dots) are set around (upper right-hand side, lower right-hand side, lower left-hand side, and upper left-hand side) the pixel 71 after the double enlargement in the vertical and horizontal directions.

It is judged that there is an edge when codes of pixel values of the 4 pixels of the high-frequency image output from the HPF 61 change, and it is judged that there is no edge when the codes of all 4 pixel values are the same. First, using the same method as in the first embodiment (FIGS. 6 and 7) for sides connecting the 4 pixel positions, a position at which the codes of the pixel values change is obtained. In the case of this embodiment, since the super-resolution processing is carried out on a 2D image, the edge position is represented by 2D coordinates. When there is an edge, the edge can be categorized into the following three.

Figure 14:
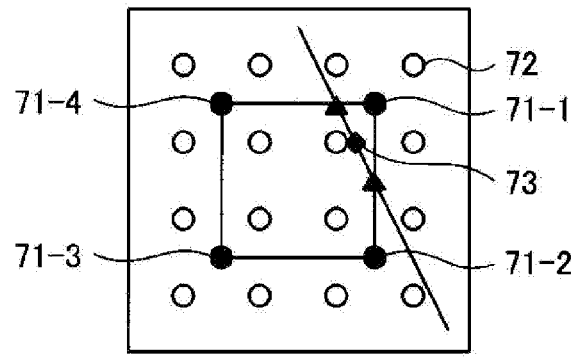
FIG. 14 is an explanatory diagram of a case where codes of pixel values of two adjacent sides differ.

FIG. 14 is an explanatory diagram of a case where codes of pixel values of two adjacent sides differ.

In this example, out of 4 sides connecting 4 pixels 71-1 to 71-4, codes of pixel values differ for a side connecting the pixels 71-1 and 71-2 and a side connecting the pixels 71-1 and 71-4.

Figure 15:
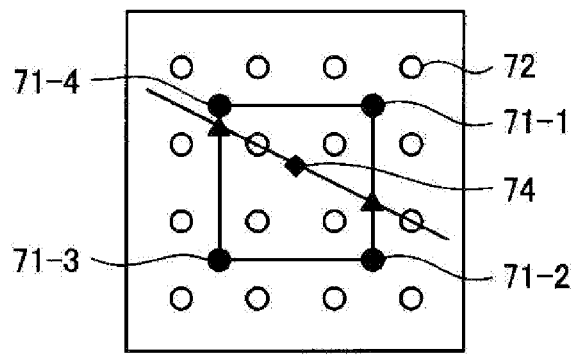
FIG. 15 is an explanatory diagram of a case where codes of pixel values of two opposing sides differ.

FIG. 15 is an explanatory diagram of a case where codes of pixel values of two opposing sides differ.

In this example, out of the 4 sides connecting the 4 pixels 71-1 to 71-4, the codes of the pixel values differ for the side connecting the pixels 71-1 and 71-2 and a side connecting the pixels 71-3 and 71-4.

Figure 16:
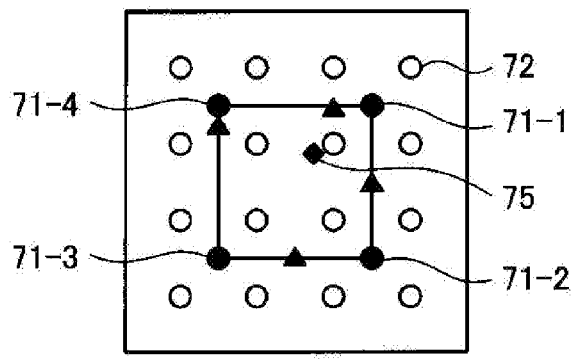
FIG. 16 is an explanatory diagram of a case where codes of pixel values of all sides differ.

FIG. 16 is an explanatory diagram of a case where codes of pixel values of all sides differ.

In this example, out of the 4 sides connecting the 4 pixels 71-1 to 71-4, the codes of the pixel values differ for all sides.

Of those, when there is a change in the codes of the pixel values on two sides (FIGS. 14 and 15), coordinates obtained by averaging the coordinates of the two edge positions (▲ in figure) obtained for the sides become final coordinates of the edge positions 73 and 74 (♦ in figure).

Further, when there is a change in the codes of the pixel values on all of the 4 sides (FIG. 16), coordinates obtained by averaging the coordinates of the 4 edge positions (▲ in figure) obtained for all of the sides become the final coordinates of the edge position 75 (♦ in figure).

It should be noted that also in this embodiment, the edge position estimation processing is an inter-pixel interpolation problem itself and may be realized by methods other than that described above (bilinear interpolation) such as a bicubic interpolation and a spline interpolation.

Referring back to FIG. 12, the coordinate conversion unit 63 carries out pixel coordinate conversion processing when it is judged by the edge judgment unit 62 that there is an edge. The coordinate conversion processing is carried out by the same method as in the first embodiment (FIG. 8) for pixel coordinates of an image in the vertical and horizontal directions. Specifically, intervals of pixel positions of an image before being enlarged are contracted about an edge position so that the inter-pixel distance of the image before being enlarged and the inter-pixel distance of the image after being enlarged become the same, and coordinates thereof are obtained. Using the result of the processing, a distance between a pixel of the image before being enlarged, that is obtained after the coordinate conversion, and a pixel of the image after being enlarged is obtained.

The input image interpolation unit 64 is an example of an interpolation unit of the present disclosure and generates, when it is judged by the edge judgment unit 62 that there is an edge, a super-resolution image by performing interpolation processing on an input image. Here, using the positional relationship between the pixel of the image before being enlarged, that is obtained after the coordinate conversion, and the pixel of the image after being enlarged, that have been calculated by the edge judgment unit 62, the pixel value at the pixel position of the image after being enlarged is interpolated based on the pixel value of the image before being enlarged. The interpolation processing is carried out on the edge circumference portion, that is, N pixels above and below the edge position and M pixels on left- and right-hand sides of the edge position (N and M are arbitrary natural numbers). The result becomes the super-resolution image on the edge circumference. It should be noted that when it is judged that there is no edge, the input image interpolation unit 64 adopts pixel values of the enlarged image obtained by the scaler 65 to be described later as the super-resolution image.

The scaler 65 is an example of the first enlargement processing unit of the present disclosure and carries out scaling processing of enlarging an input image in the vertical and horizontal directions by a desired enlargement factor for a purpose different from the edge extraction. Here, the input image is doubly enlarged in the vertical and horizontal directions so that the pixel count is converted into 4 times the pixel count. It should be noted that as described above, the scaler 65 is also applicable to a case where enlargement factors other than twice are used according to settings. Such an enlargement may be performed by the enlargement processing of the related art or may be performed by super-resolution processing unrelated to the present disclosure.

The synthesis unit 66 synthesizes the super-resolution image generated by the input image interpolation unit 64 and the enlarged image generated by the scaler 65. At this time, while the super-resolution image and the enlarged image are blended at the edge circumference, a blend ratio of the super-resolution image (super-resolution pixel values) and the enlarged image (enlarged pixel values) is changed according to the pixel values of the pixels of the high-frequency component of the input image obtained by the HPF 61 (high-frequency component amount). As a result, the enlarged image and the super-resolution image can be connected smoothly in synthesizing the images. For example, a synthesis pixel value after the synthesis processing is calculated as follows.

Synthesis pixel value=$\alpha$*super-resolution pixel value+
$(1-\alpha)$*enlarged pixel value provided that $\alpha$=|high-frequency component amount|/|maximum high-frequency component amount|

The maximum high-frequency component amount is a maximum value of the pixel values of the pixels included in the edge circumference portion of the enlarged image.

In the blending method, only a part of a domain of the high-frequency component is used instead of using the entire domain as described above, and the coefficient $\alpha$ that determines the blend ratio may be set to 1 or 0 outside that range. Specifically, instead of determining a based on the magnitude of the high-frequency component amount with respect to the maximum high-frequency component amount, the coefficient $\alpha$ is set to 1 when the high-frequency component amount is equal to or larger than a setting value and is set to 0 when the high-frequency component amount is smaller than the setting value.

Moreover, various methods like nonlinearly varying the blend ratio with respect to the high-frequency component amount are conceivable. For example, the method is not limited to the calculation expression described above, and pixels having a larger high-frequency component amount may be weighted more.

(Operational Example of Image Processing Unit)

Next, a super-resolution processing example of the image processing unit 3A will be described with reference to the flowchart of FIG. 17.

As the super-resolution processing is started, the scaler 65 first carries out scaling processing of enlarging an image input to the image processing unit 3A in the vertical and horizontal directions and generates an enlarged image (Step S11). The relationship between pixel positions of the image before being enlarged and the pixel positions of the image after being enlarged is shown in FIG. 13. The enlarged image is used for synthesizing with a super-resolution image at the final stage.

Next, the HPF 61 carries out high-pass filter processing on the input image and outputs a high-frequency image (Step S12).

Then, the edge judgment unit 62 judges whether there is an edge for each pixel of the high-frequency image output from the HPF 61 and estimates an edge position (Step S13). Here, when there is an edge (see FIGS. 14 to 16), the processing advances to Step S14, and when there is no edge, the processing advances to Step S16.

When it is judged by the judgment processing of Step S13 that there is an edge, the coordinate conversion unit 63 carries out processing of converting coordinate of pixels in the edge circumference portion of the input image before being enlarged based on the edge position estimated by the edge judgment unit 62 (Step S14).

Subsequently, the input image interpolation unit 64 uses the pixel values of the input image to carry out interpolation processing of the pixel values at the pixel positions of the enlarged image output from the scaler 65 based on the coordinate conversion result output from the coordinate conversion unit 63 (Step S15).

When it is judged in the judgment processing of Step S13 that there is no edge, the pixel values of the enlarged image obtained by the scaler 65 are used as the pixel values of the super-resolution image without carrying out the coordinate conversion processing and the input image interpolation processing.

The high-frequency interpolation processing is carried out after the processing of Steps S15 and S16 is ended (Step S17).

Then, the synthesis unit 66 carries out processing of synthesizing the super-resolution component generated by the input image interpolation unit 64 and the enlarged image generated by the scaler 65 (Step S18).

The super-resolution processing is ended after the synthesis processing is ended for all pixels of the enlarged image, and when the synthesis processing is not ended for all pixels of the enlarged image, the synthesis processing is continued for the rest of the pixels.

Figure 17:
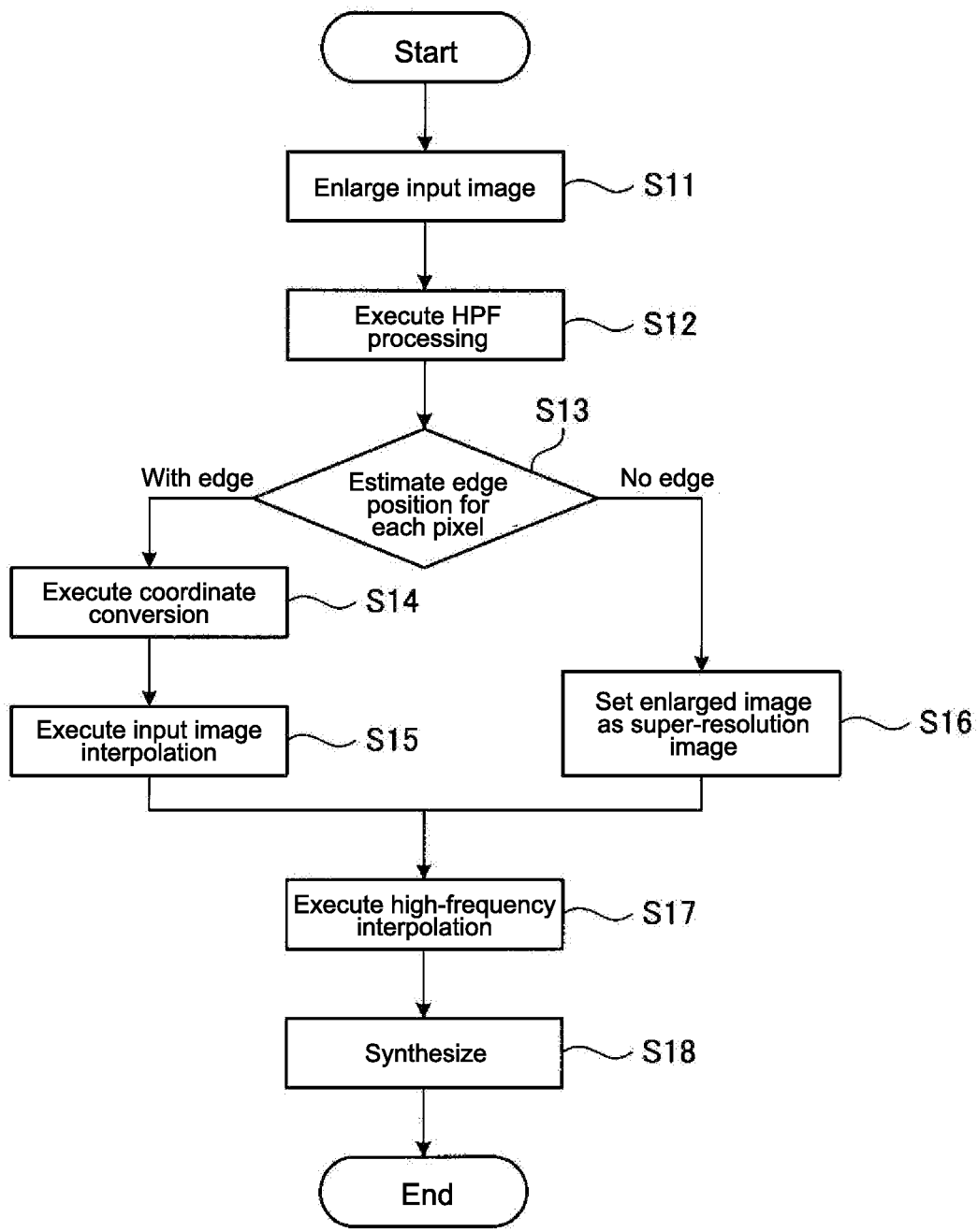
FIG. 17 is a flowchart showing a super-resolution processing example carried out by the image processing unit shown in FIG. 12.

In the example shown in FIG. 17, the input image is enlarged by the scaler 65 in Step S11. However, the enlargement processing of the input image only needs to be carried out before Step S18 in which the synthesis processing with a super-resolution image is carried out.

In the second embodiment structured as described above, unlike the first embodiment, a super-resolution image including components other than the high-frequency component is generated by the input image interpolation unit 64 and synthesized with a synthesis image to generate a super-resolution enlarged image.

In the second embodiment, the super-resolution enlargement of an image can be realized by combining a general filter operation and coordinate calculation as in the first embodiment. Therefore, in this embodiment, a data processing amount is smaller than that of the technique of the related art, and the super-resolution enlargement of an image can be realized with low-cost hardware. In addition, since the data processing amount can be suppressed, power consumptions of hardware can also be suppressed.

Furthermore, in this embodiment, time, effort and costs for development can be reduced since advance learning or the like is unnecessary.

Moreover, in this embodiment, since the image enlargement function of the scaler after the HPF processing is not included as compared to the structure of the first embodiment, the same effect can be obtained with a simpler structure.

It should be noted that a scaler for an edge extraction (e.g., vertical scaler 12) may be provided although not provided in the second embodiment. In this case, an edge position can be obtained more accurately.

<3. Others>

In the first embodiment described above, the example where the edge judgment unit 13 estimates an edge position using an image obtained by enlarging, by the vertical scaler 12, a high-frequency component of an input image extracted by the vertical HPF 11 has been described, though not limited thereto. For example, a structure for estimating an edge position using a high-frequency component extracted by the HPF after an input image is enlarged by the vertical scaler may be adopted.

Moreover, in the embodiments described above, correction processing means for carrying out a defect correction or the like may be provided between the image pickup unit 2 and the image processing unit 3 so that image data subjected to correction processing is input to the image processing unit 3. Alternatively, a blur correction may be carried out simultaneous with the input image enlargement by the scaler. By carrying out the processing for improving an image quality before carrying out the high-pass filter processing by the HPF as described above, the judgment on whether there is an edge and the edge position estimation can be performed more accurately.

In the embodiments described above, the super-resolution image may be generated after enlarging the input image or the high-frequency component of the input image to a size smaller than a final image to be generated but larger than the input image. For example, although the enlargement factor of twice has been used for the vertical scalers 12 and 16 in the first embodiment, the enlargement factor of the vertical scaler 12 is set to be smaller than twice.

It is also possible to use, while setting the enlargement factor of a portion to be enlarged as the super-resolution image to be small as described above, the enlargement technique of the related art until reaching a desired enlargement factor. For example, for enlarging an input image to 4 times the size, the input image is enlarged to twice the size by the super-resolution processing and enlarged to twice the size by the enlargement technique of the related art. As a result, the input image does not become an unnatural image when the enlargement factor thereof is too large, and a natural super-resolution enlarged image can thus be obtained.

Moreover, a synthesis with the enlarged image may be carried out after the super-resolution component generated from the input image is filtered. For example, a structure for generating components up to a 4-time super-resolution enlargement (super-resolution components) and extracting components up to a double enlargement from those components may be adopted.

Further, the enlargement factor or filter component may be changed as appropriate according to a probable edge of each pixel of an input image. Specifically, an enlargement amount with which an input image is to be partially enlarged in super-resolution may be changed as appropriate based on the probable edge.

The probable edge is judged when, in a case where the high-frequency component crosses 0 (i.e., there is an edge), a difference between signal values before and after the point where the high-frequency component crosses 0 is large. From the obtained probable edge, the super-resolution processing is carried out with a larger enlargement factor for a more-probable edge portion, and the super-resolution processing is carried out with a smaller enlargement factor for other portions.

Furthermore, although the coefficient $\alpha$ that determines the blend ratio has been determined based on the magnitude of the high-frequency component amount with respect to the maximum high-frequency component amount in the second embodiment, this method is also applicable to the first embodiment. For example, when the method is applied to the first embodiment, the synthesis pixel value obtained after synthesizing the enlarged image and the super-resolution component is calculated as follows.

Synthesis pixel value=$\alpha$*super-resolution pixel value+ enlarged pixel value The reason for this calculation expression is that the super-resolution image that is output from the input image interpolation unit 64 and synthesized with the enlarged image in the second embodiment also includes a frequency component other than the high-frequency component. The super-resolution image output from the high-frequency interpolation unit 15 in the first embodiment only includes the high-frequency component.

Moreover, although the 2D image is subjected to the super-resolution processing as it is in the 2D state in the second embodiment, it is also possible to carry out the super-resolution processing of an input image in one of the vertical and horizontal directions first and then carry out the super-resolution processing in the other one of the directions as in the first embodiment.

It should be noted that the present disclosure may also take the following structures.

(1) An image processing apparatus, including:
a high-pass filter configured to extract a high-frequency component of an input image;
an edge judgment unit configured to judge whether there is an edge in the input image based on the high-frequency component of the input image extracted by the high-pass filter and estimate an edge position when there is an edge;
a coordinate conversion unit configured to obtain an edge position in an enlarged image obtained by enlarging the input image, the edge position corresponding to the edge position estimated by the edge judgment unit;
an interpolation unit configured to obtain, regarding a position where an edge position of the high-frequency component of the input image and the edge position of the enlarged image overlap, a pixel value at each pixel position of an edge circumference of the enlarged image using a pixel value of the high-frequency component of the input image;
a first enlargement processing unit configured to generate the enlarged image by enlarging the input image by a desired enlargement factor; and
a synthesis unit configured to synthesize the interpolated pixel value of the high-frequency component of the edge circumference and the pixel value of the pixel of the enlarged image.

(2) The image processing apparatus according to (1) above, in which the edge judgment unit obtains the edge position from a position where codes of pixel values of adjacent pixels included in the high-frequency component of the input image extracted by the high-pass filter differ.

(3) The image processing apparatus according to (1) or (2) above, further including
a second enlargement processing unit configured to enlarge an image by a predetermined enlargement factor,
in which the edge judgment unit performs one of an estimation of the edge position using an image obtained by enlarging, by the second enlargement processing unit, the high-frequency component of the input image extracted by the high-pass filter and an estimation of the edge position using a high-frequency component extracted by the high-pass filter after the input image is enlarged by the second enlargement processing unit.

(4) An image pickup apparatus, including:
an image pickup unit; and
an image processing unit including
a high-pass filter that extracts a high-frequency component of an input image supplied from the image pickup unit,
an edge judgment unit that estimates an edge position in the input image from the high-frequency component of the input image extracted by the high-pass filter,
a coordinate conversion unit that obtains an edge position in an enlarged image corresponding to the edge position estimated by the edge judgment unit,
an interpolation unit that obtains a pixel value at each pixel position of an edge circumference of the enlarged image using a pixel value of the high-frequency component of the input image when an edge position of the high-frequency component of the input image and the edge position of the enlarged image overlap,
a first enlargement processing unit that generates the enlarged image by enlarging the input image by a desired enlargement factor, and
a synthesis unit that synthesizes the interpolated pixel value of the high-frequency component of the edge circumference and the pixel value of the pixel of the enlarged image.

(5) An image processing method, including:
extracting a high-frequency component of an input image;
judging whether there is an edge in the input image based on the extracted high-frequency component of the input image and estimating an edge position when there is an edge;
obtaining an edge position in an enlarged image obtained by enlarging the input image, the edge position corresponding to the estimated edge position;
obtaining, regarding a position where an edge position of the high-frequency component of the input image and the edge position of the enlarged image overlap, a pixel value at each pixel position of an edge circumference of the enlarged image using a pixel value of the high-frequency component of the input image; and
synthesizing the interpolated pixel value of the high-frequency component of the edge circumference and the pixel value of the pixel of the enlarged image.

(6) An image processing apparatus, including:
a high-pass filter configured to extract a high-frequency component of an input image;
an edge judgment unit configured to judge whether there is an edge in the input image based on the high-frequency component of the input image extracted by the high-pass filter and estimate an edge position when there is an edge;
a coordinate conversion unit configured to obtain an edge position in an enlarged image obtained by enlarging the input image, the edge position corresponding to the edge position estimated by the edge judgment unit;

an interpolation unit configured to obtain, regarding a position where an edge position of the high-frequency component of the input image and the edge position of the enlarged image overlap, a pixel value at each pixel position of an edge circumference of the enlarged image using a pixel value of the input image;

a first enlargement processing unit configured to generate the enlarged image by enlarging the input image by a desired enlargement factor; and a synthesis unit configured to synthesize the interpolated pixel value of the edge circumference and the pixel value of the pixel of the enlarged image.

(7) The image processing apparatus according to (6) above, in which the edge judgment unit obtains the edge position from a position where codes of pixel values of adjacent pixels included in the high-frequency component of the input image extracted by the high-pass filter differ.

(8) The image processing apparatus according to (6) or (7) above, further including a second enlargement processing unit configured to enlarge an image by a predetermined enlargement factor, in which the edge judgment unit performs one of an estimation of the edge position using an image obtained by enlarging, by the second enlargement processing unit, the high-frequency component of the input image extracted by the high-pass filter and an estimation of the edge position using a high-frequency component extracted by the high-pass filter after the input image is enlarged by the second enlargement processing unit.

(9) An image pickup apparatus, including:

an image pickup unit; and an image processing unit including a high-pass filter that extracts a high-frequency component of an input image supplied from the image pickup unit, an edge judgment unit that estimates an edge position in the input image from the high-frequency component of the input image extracted by the high-pass filter, a coordinate conversion unit that obtains an edge position in an enlarged image corresponding to the edge position estimated by the edge judgment unit, an interpolation unit that obtains a pixel value at each pixel position of an edge circumference of the enlarged image using a pixel value of the input image when an edge position of the high-frequency component of the input image and the edge position of the enlarged image overlap, a first enlargement processing unit that generates the enlarged image by enlarging the input image by a desired enlargement factor, and a synthesis unit that synthesizes the interpolated pixel value of the edge circumference and the pixel value of the pixel of the enlarged image.

(10) An image processing method, including:

extracting a high-frequency component of an input image;

judging whether there is an edge in the input image based on the extracted high-frequency component of the input image and estimating an edge position when there is an edge;

obtaining an edge position in an enlarged image obtained by enlarging the input image, the edge position corresponding to the estimated edge position;

obtaining, regarding a position where an edge position of the high-frequency component of the input image and the edge position of the enlarged image overlap, a pixel value at each pixel position of an edge circumference of the enlarged image using a pixel value of the input image; and synthesizing the interpolated pixel value of the edge circumference and the pixel value of the pixel of the enlarged image.

Further, as described above, the digital still camera taken as an example of the image pickup apparatus carries out the image processing of enlarging a still image in super-resolution. As an apparatus on which blocks for performing such image processing are mounted, other apparatuses are also applicable in addition to the digital still camera. For example, as such an apparatus, the present disclosure is applicable to an image pickup apparatus such as a digital still camera that generates a moving image constituted of a plurality of frame images in a predetermined frame cycle. Those image pickup apparatuses are also applicable to a monitoring camera, a medical camera, and the like. In addition, the apparatuses are also applicable to an apparatus or computer program that processes or edits an image. Moreover, the apparatuses may also be applicable to a printer, a display apparatus such as a display, and the like.

(Structural Example of Computer Hardware)

The series of processing described above may be executed either by hardware or software. When executing the series of processing by software, a program constituting the software is installed from a program recording medium in a computer into which the program is incorporated in dedicated hardware or, for example, a general-purpose personal computer capable of executing various functions by installing various programs.

Figure 18:
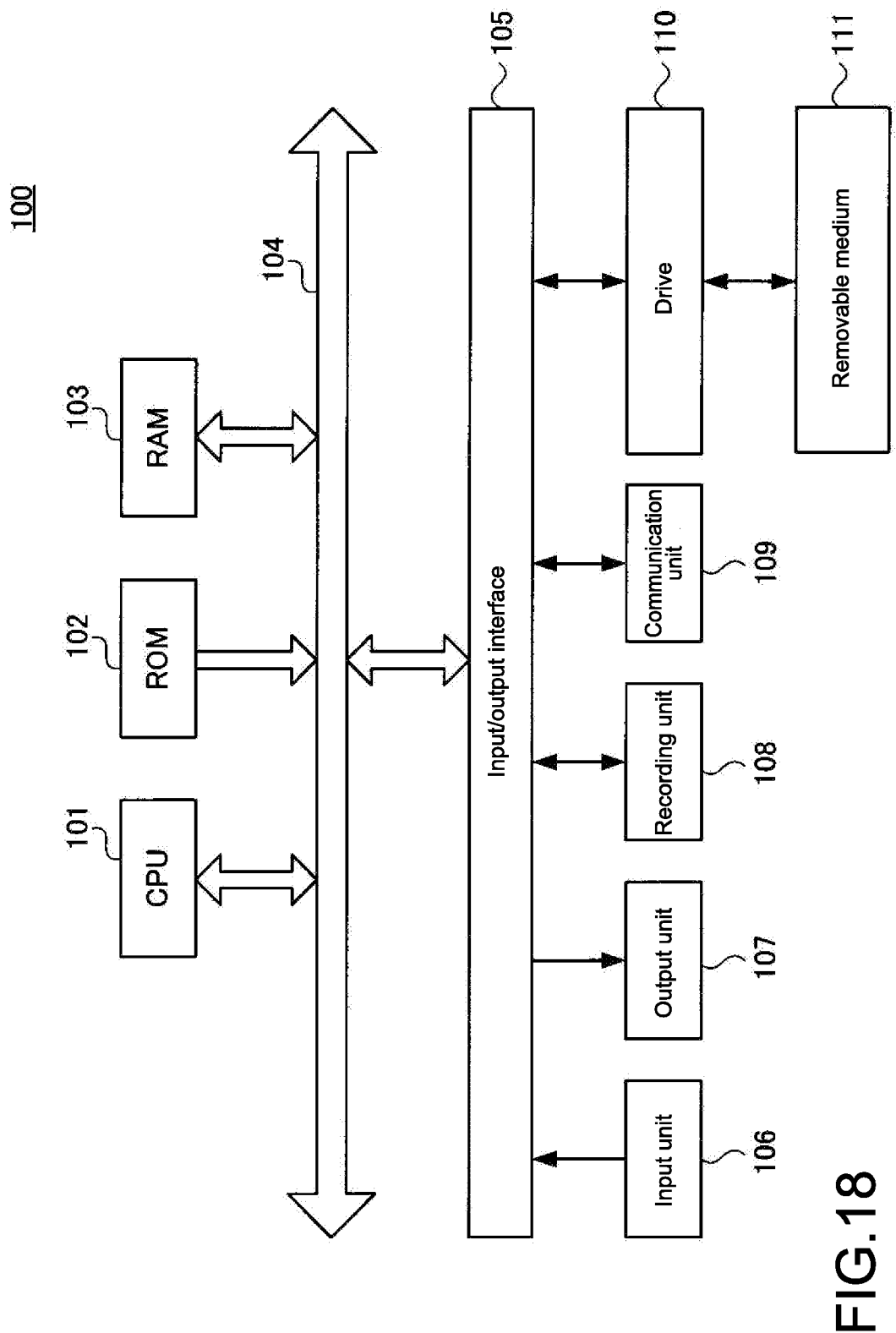
FIG. 18 is a block diagram showing a structural example of computer hardware.

FIG. 18 is a block diagram showing a hardware structural example of a computer that executes the series of processing described above by a program.

In the computer, a CPU 101, a ROM (Read Only Memory) 102, and a RAM 103 are mutually connected by a bus 104.

An input/output interface 105 is also connected to the bus 104. Connected to the input/output interface 105 are an input unit 106 constituted of a keyboard, a mouse, a microphone, and the like, an output unit 107 constituted of a display, a speaker, and the like, a recording unit 108 constituted of a hard disk, a nonvolatile memory, and the like, a communication unit 109 constituted of a network interface and the like, and a drive 110 that drives a removable medium 111 such as a magnetic disk, an optical disc, a magneto optical disc, and a semiconductor memory.

In the computer structured as described above, the CPU 101 loads a program recorded onto the recording unit 108 to the RAM 103 via the input/output interface 105 and the bus 104 and executes it, to thus carry out the series of processing described above.

The program executed by the computer (CPU 101) is recorded onto the removable medium 111 as a package medium constituted of, for example, a magnetic disk (including flexible disk), an optical disc (CD-ROM (Compact Disc-Read Only Memory), DVD (Digital Versatile Disc), etc.), a magneto optical disc, or a semiconductor memory, or provided via a wired or wireless transmission medium such as a local area network, the Internet, and digital satellite broadcasting.

By loading the removable medium 111 in the drive 110, the program can be installed in the recording unit 108 via the input/output interface 105. Moreover, the program can be received by the communication unit 109 and installed in the recording unit 108 via the wired or wireless transmission medium. In addition, the program can be installed in advance in the ROM 102 or the recording unit 108.

It should be noted that the program executed by the computer may be a program for carrying out the processing in time series in the order stated in the specification or a program for carrying out the processing in parallel or as necessary when invoked.

It should be noted that the embodiment of the present disclosure is not limited to the embodiments described above and can be variously modified without departing from the gist of the present disclosure.

Furthermore, in the specification, the processing steps describing the processing in time series include not only the processing carried out in time series in the stated order but also processing that is executed in parallel or individually without being processed in time series (e.g., parallel processing or processing by object).

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus, comprising:
   a processor; and
   a memory, the memory storing program code executable by the processor to perform operations comprising:
   high-pass filtering to extract a high-frequency component of an input image;
   edge judgment to judge whether there is an edge in the input image based on the high-frequency component of the input image extracted by the high-pass filtering and estimate an edge position when there is an edge;
   coordinate conversion to obtain an edge position in an enlarged image obtained by enlarging the input image, the edge position corresponding to the edge position estimated by the edge judgment;
   interpolation to obtain, regarding a position where an edge position of the high-frequency component of the input image and the edge position of the enlarged image overlap, a pixel value at each pixel position of an edge circumference of the enlarged image using a pixel value of the high-frequency component of the input image;
   first enlargement processing to generate the enlarged image by enlarging the input image by a desired enlargement factor; and
   synthesis to synthesize the interpolated pixel value of the high-frequency component of the edge circumference and the pixel value of the pixel of the enlarged image.

2. The image processing apparatus according to claim 1, wherein the edge judgment obtains the edge position from a position where codes of pixel values of adjacent pixels included in the high-frequency component of the input image extracted by the high-pass filtering differ.

3. The image processing apparatus according to claim 2, wherein the operations further comprise:
   second enlargement processing to enlarge an image by a predetermined enlargement factor,
   wherein the edge judgment performs one of an estimation of the edge position using an image obtained by enlarging, by the second enlargement processing, the high-frequency component of the input image extracted by the high-pass filtering and an estimation of the edge position using a high-frequency component extracted by the high-pass filtering after the input image is enlarged by the second enlargement processing.

4. An image pickup apparatus, comprising:
   an image pickup unit; and
   an image processing unit configured to perform:
   high-pass filtering that extracts a high-frequency component of an input image supplied from the image pickup unit,
   edge judgment that estimates an edge position in the input image from the high-frequency component of the input image extracted by the high-pass filtering,
   coordinate conversion that obtains an edge position in an enlarged image corresponding to the edge position estimated by the edge judgment,
   interpolation that obtains a pixel value at each pixel position of an edge circumference of the enlarged image using a pixel value of the high-frequency component of the input image when an edge position of the high-frequency component of the input image and the edge position of the enlarged image overlap,
   first enlargement processing that generates the enlarged image by enlarging the input image by a desired enlargement factor, and
   synthesis that synthesizes the interpolated pixel value of the high-frequency component of the edge circumference and the pixel value of the pixel of the enlarged image.

5. The image pickup apparatus according to claim 4, wherein the edge judgment obtains the edge position from a position where codes of pixel values of adjacent pixels included in the high-frequency component of the input image extracted by the high-pass filtering differ.

6. The image pickup apparatus according to claim 5, wherein the image processing unit is configured for:
   second enlargement processing to enlarge an image by a predetermined enlargement factor,
   wherein the edge judgment performs one of an estimation of the edge position using an image obtained by enlarging, by the second enlargement processing, the high-frequency component of the input image extracted by the high-pass filtering and an estimation of the edge position using a high-frequency component extracted by the high-pass filtering after the input image is enlarged by the second enlargement processing.

7. An image processing method, comprising:
   extracting a high-frequency component of an input image;
   judging whether there is an edge in the input image based on the extracted high-frequency component of the input image and estimating an edge position when there is an edge;
   obtaining an edge position in an enlarged image obtained by enlarging the input image, the edge position corresponding to the estimated edge position;
   obtaining, regarding a position where an edge position of the high-frequency component of the input image and the edge position of the enlarged image overlap, a pixel value at each pixel position of an edge circumference of the enlarged image using a pixel value of the high-frequency component of the input image; and
   synthesizing the interpolated pixel value of the high-frequency component of the edge circumference and the pixel value of the pixel of the enlarged image.

8. The image processing method according to claim 7, wherein the edge judgment obtains the edge position from a position where codes of pixel values of adjacent pixels included in the high-frequency component of the input image extracted by the high-pass filtering differ.

9. The image processing method according to claim 8, further comprising:
   additional enlargement processing to enlarge an image by a predetermined enlargement factor, wherein the edge judgment performs one of an estimation of the edge position using an image obtained by enlarging, by the second enlargement processing, the high-frequency component of the input image extracted by the high-pass filtering and an estimation of the edge position using a high-frequency component extracted by the high-pass filtering after the input image is enlarged by the second enlargement processing.

10. An image processing apparatus, comprising:
a processor; and
a memory, the memory storing program code executable by the processor to perform operations comprising:
high-pass filtering to extract a high-frequency component of an input image;
edge judgment to judge whether there is an edge in the input image based on the high-frequency component of the input image extracted by the high-pass filtering and estimate an edge position when there is an edge;
coordinate conversion to obtain an edge position in an enlarged image obtained by enlarging the input image, the edge position corresponding to the edge position estimated by the edge judgment;
interpolation to obtain, regarding a position where an edge position of the high-frequency component of the input image and the edge position of the enlarged image overlap, a pixel value at each pixel position of an edge circumference of the enlarged image using a pixel value of the input image;
first enlargement processing to generate the enlarged image by enlarging the input image by a desired enlargement factor; and
synthesis to synthesize the interpolated pixel value of the edge circumference and the pixel value of the pixel of the enlarged image.

11. The image processing apparatus according to claim 10, wherein the edge judgment obtains the edge position from a position where codes of pixel values of adjacent pixels included in the high-frequency component of the input image extracted by the high-pass filtering differ.

12. The image processing apparatus according to claim 11, further comprising
second enlargement processing to enlarge an image by a predetermined enlargement factor,
wherein the edge judgment performs one of an estimation of the edge position using an image obtained by enlarging, by the second enlargement processing, the high-frequency component of the input image extracted by the high-pass filtering and an estimation of the edge position using a high-frequency component extracted by the high-pass filtering after the input image is enlarged by the second enlargement processing.

13. An image pickup apparatus, comprising:
an image pickup unit; and
an image processing unit configured to perform:
high-pass filtering that extracts a high-frequency component of an input image supplied from the image pickup unit,
edge judgment that estimates an edge position in the input image from the high-frequency component of the input image extracted by the high-pass filtering,
coordinate conversion that obtains an edge position in an enlarged image corresponding to the edge position estimated by the edge judgment,
interpolation that obtains a pixel value at each pixel position of an edge circumference of the enlarged image using a pixel value of the input image when an edge position of the high-frequency component of the input image and the edge position of the enlarged image overlap,
first enlargement processing that generates the enlarged image by enlarging the input image by a desired enlargement factor, and
synthesis that synthesizes the interpolated pixel value of the edge circumference and the pixel value of the pixel of the enlarged image.

14. The image pickup apparatus according to claim 13, wherein the edge judgment obtains the edge position from a position where codes of pixel values of adjacent pixels included in the high-frequency component of the input image extracted by the high-pass filtering differ.

15. The image pickup apparatus according to claim 14, wherein the image processing unit is configured for:
second enlargement processing to enlarge an image by a predetermined enlargement factor, wherein the edge judgment performs one of an estimation of the edge position using an image obtained by enlarging, by the second enlargement processing, the high-frequency component of the input image extracted by the high-pass filtering and an estimation of the edge position using a high-frequency component extracted by the high-pass filtering after the input image is enlarged by the second enlargement processing.

16. An image processing method, comprising:
extracting a high-frequency component of an input image;
judging whether there is an edge in the input image based on the extracted high-frequency component of the input image and estimating an edge position when there is an edge;
obtaining an edge position in an enlarged image obtained by enlarging the input image, the edge position corresponding to the estimated edge position;
obtaining, regarding a position where an edge position of the high-frequency component of the input image and the edge position of the enlarged image overlap, a pixel value at each pixel position of an edge circumference of the enlarged image using a pixel value of the input image; and
synthesizing the interpolated pixel value of the edge circumference and the pixel value of the pixel of the enlarged image.

17. The image processing method according to claim 16, wherein the edge judgment obtains the edge position from a position where codes of pixel values of adjacent pixels included in the high-frequency component of the input image extracted by the high-pass filtering differ.

18. The image processing method according to claim 17, further comprising:
additional enlargement processing to enlarge an image by a predetermined enlargement factor,
wherein the edge judgment performs one of an estimation of the edge position using an image obtained by enlarging, by the second enlargement processing, the high-frequency component of the input image extracted by the high-pass filtering and an estimation of the edge position using a high-frequency component extracted by the high-pass filtering after the input image is enlarged by the second enlargement processing.

* * * * *